(12) United States Patent
Dillow

(10) Patent No.: US 11,647,293 B2
(45) Date of Patent: May 9, 2023

(54) SUSPENDED PHOTOBOOTH WITH RETRACTABLE CAMERA FOR IMAGING A VEHICLE

(71) Applicant: ADESA, Inc., Carmel, IN (US)

(72) Inventor: Christopher Dillow, Carmel, IN (US)

(73) Assignee: ADESA, Inc., Carmel, IN (US)

(*) Notice: Subject to any disclaimer, the term of this patent is extended or adjusted under 35 U.S.C. 154(b) by 0 days.

(21) Appl. No.: 17/409,230

(22) Filed: Aug. 23, 2021

(65) Prior Publication Data

US 2022/0060633 A1 Feb. 24, 2022

Related U.S. Application Data

(60) Provisional application No. 63/069,280, filed on Aug. 24, 2020.

(51) Int. Cl.
*H04N 23/695* (2023.01)
*F16M 13/02* (2006.01)
*H04N 1/00* (2006.01)
*H04N 23/51* (2023.01)
*H04N 23/74* (2023.01)

(52) U.S. Cl.
CPC ........ *H04N 23/695* (2023.01); *F16M 13/027* (2013.01); *H04N 1/00289* (2013.01); *H04N 23/51* (2023.01); *H04N 23/74* (2023.01)

(58) Field of Classification Search
CPC .. H04N 1/00289; H04N 5/225; H04N 5/2251; H04N 5/2252; H04N 5/2253; H04N 5/2254; H04N 5/2256; H04N 5/2257; H04N 5/2258; H04N 5/2354; H04N 5/23299; H04N 23/695; H04N 23/50; H04N 23/51; H04N 23/54; H04N 23/56; H04N 23/57; H04N 23/58; H04N 23/74; G03B 17/561; G03B 17/566; G03B 15/006; F16M 11/00–425; F16M 13/00; F16M 13/005;

(Continued)

(56) References Cited

U.S. PATENT DOCUMENTS 10,580,234 B2 3/2020 Dillow
2005/0089375 A1 4/2005 Fox (Continued)

OTHER PUBLICATIONS

"Stock Vector Hot Rolled Standard Beam-I", Figures pp. 1-1. Obtained Jul. 21, 2018.

(Continued)

*Primary Examiner* — Twyler L Haskins
*Assistant Examiner* — Akshay Trehan
(74) *Attorney, Agent, or Firm* — Lempia Summerfield Katz LLC

(57) ABSTRACT

A photobooth that is suspended from a rigid non-moving structure, such as a ceiling, is disclosed. The photobooth may include a support structure that includes a non-movable section and a movable section. The non-movable section is not moved and remains fixed after installation relative to the ceiling. The movable section may comprise posts or brackets, may move relative to the non-movable section, and may include one or both of a camera or lighting. Further, to rigidize the support structure, a track may be attached to some or all of the posts or brackets, thereby rigidizing the structure and reducing jitter which may affect operation of the camera or lighting.

19 Claims, 16 Drawing Sheets

(58) Field of Classification Search
CPC .... F16M 13/02; F16M 13/022; F16M 13/025; F16M 13/027
See application file for complete search history.

(56) References Cited

U.S. PATENT DOCUMENTS

| | | | |
|---|---|---|---|
| 2011/0290292 A1 | 12/2011 | Kaiser | |
| 2014/0150706 A1 | 6/2014 | Kent | |
| 2016/0073061 A1 | 3/2016 | Dillow | |
| 2016/0100087 A1* | 4/2016 | Scheich | H04N 5/247 348/47 |
| 2016/0173740 A1* | 6/2016 | Corby | H04N 5/222 348/148 |
| 2016/0353022 A1* | 12/2016 | Mueller | A61B 5/6889 |
| 2018/0302572 A1* | 10/2018 | Barnes | H04N 13/243 |
| 2019/0011806 A1* | 1/2019 | Zilban | B62D 63/061 |
| 2020/0074675 A1* | 3/2020 | Cejka | H04N 5/247 |
| 2020/0074825 A1* | 3/2020 | Martin | G08B 13/19632 |

OTHER PUBLICATIONS

"The Ultimate Difference Between H-Beam and I-Beam", Figures pp. 1-1. Obtained Jul. 21, 2018.
I-Beam Monorail—Allied Conveyor Systems. http://www.alliedconveyorsystems.com/catalogs/I-Beam.pdf. Obtained Jul. 21, 2018.

\* cited by examiner

SUSPENDED PHOTOBOOTH WITH RETRACTABLE CAMERA FOR IMAGING A VEHICLE

REFERENCE TO RELATED APPLICATION

The present application claims the priority benefit of US Provisional Patent Application Ser. No. 63/069,280, the entirety of which is incorporated by reference herein.

FIELD OF THE INVENTION

The present application relates generally to a photobooth configured to obtain images or video of a vehicle, and more particularly to a photobooth whose structure is suspended from a ceiling.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Images and/or videos of vehicles, such as automobiles, motorcycles, boats, ATVs, or the like, may assist in the sale of vehicles. Photobooths, such as those disclosed in US Patent Application Publication No. 2016/0073061 A1 and U.S. Pat. No. 10,580,234, both of which are incorporated by reference herein in their entirety, may assist in obtaining the images and/or videos of the vehicles

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION OF THE INVENTION

Figure 1:
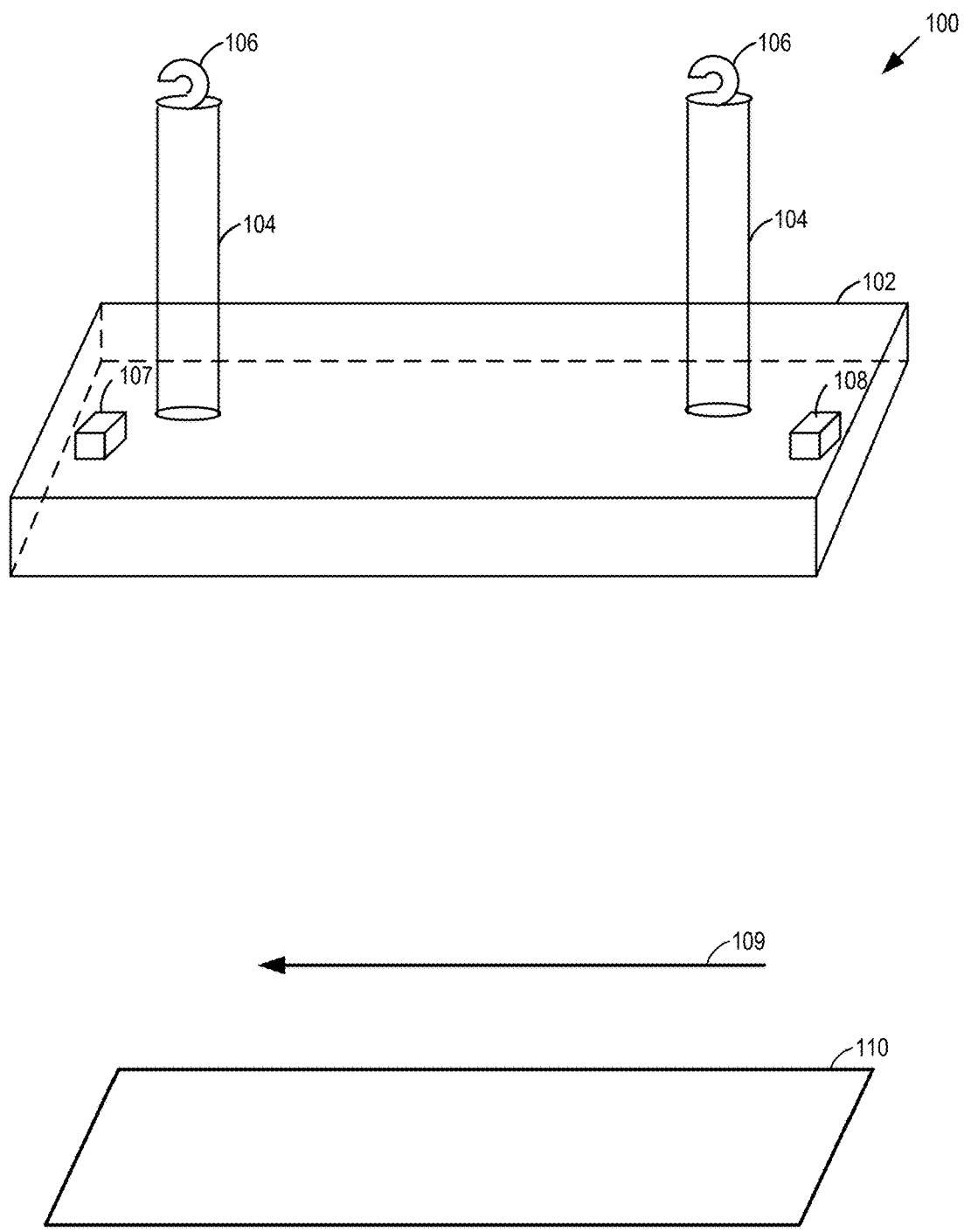
FIG. 1 shows a perspective view of a first example of the top structure of the photobooth.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, a photobooth may be configured to generate images and/or videos of vehicles (or other types of objects). Any discussion herein regarding obtaining images via the photobooth may likewise be applied to obtaining videos via the photobooth. One type of photobooth comprises a structure that rests on the ground and into which the vehicle is driven. Another type of photobooth comprises a structure that is suspended from a rigid non-moving structure relative to ground (e.g., the ceiling). In one or some embodiments, the support structure may include two sections: (i) non-movable section(s) (that are not moved and remain fixed after installation relative to the ceiling); and (ii) movable section(s) (that are moved relative to the non-movable section(s) in order to obtain images/videos of the vehicle).

In one or some embodiments, at least a part of the support structure, such as the non-movable section(s), is connected to a rigid non-moving structure relative to the ground (e.g., the ceiling) via a single support bracket. Alternatively, at least a part of the support structure, such as the non-movable section(s), is connected to the ceiling via multiple support brackets (e.g., at least two support brackets; at least three support brackets; at least four support brackets; etc.). The multiple support brackets may be evenly geometrically spaced about the non-movable section(s) of the support structure.

The movable section(s) may be connected to the non-movable section(s) and may be configured to move toward and/or around a vehicle underneath the support structure. In one or some embodiments, the movable section may comprise a series of posts, such as telescoping posts. Responsive to sensing a vehicle is underneath the support structure, the posts may be moved downward, such as directly downward toward the floor. One or both of a camera or lighting may be affixed to one, some, or each of the posts. For example, the camera/lighting may be affixed to the post(s) so that the camera/lighting are in fixed relation to one another, thereby enabling proper lighting of the vehicle. In one or some embodiments, a camera/lighting combination may be positioned at the end of one, some, or each of the downward-moving posts.

Alternatively, or in addition, a track is connected between at least two of the downward-moving posts, such as at an end of the at least two of the downward moving posts. Camera/lighting may be attached to the track so that when the track is extended/retracted, the camera/lighting may likewise be extended/retracted. In operation, the track is suspended above the ground and dynamically at least partly encircles the vehicle. In this way, the track may at least partly encircle, or entirely encircle the downward-moving posts (such as at least 50% encircling, at least 60% encircling, at least 70% encircling, at least 80% encircling, at least 90% encircling, at least 95% encircling, or 100% encircling of the vehicle). In this way, the track may provide additional support structure in order to rigidize the downward-moving posts, thereby reducing the potential for jitter when the camera(s), which is connected to the track and/or the posts, obtains images of the vehicle. Specifically, in one embodiment, after extension of the track, the camera/lighting combination may move along the track. As another example, after extension of the posts/track, camera/lighting combinations, which may be connected to one or both of the posts or the track, may obtain pictures with less jitter due to the more rigid structure of the posts/track (e.g., cameras attached to the posts may be less subject to jitter to due to the posts being rigidized by the track connecting between posts).

Alternatively, or in addition, the movable section(s) may include a curtain or the like that may be lowered toward the floor. When lowered, the curtain may provide a predetermined (e.g., white) background against which the photographs or videos of the vehicle may be taken. In this way, the combination of curtain/camera(s)/lighting may be suspended from the ceiling and extendable/retractable. In one or some embodiments, the movable section(s) associated with the lowering/raising of the camera/lighting may be associated with the lowering/raising of the curtain. As one example, common motors and gearing may lower/raise the camera/lighting and the curtain in combination (e.g., the curtain may be lowered to the floor as the camera/lighting is lowered to ½ between the ceiling and the floor). Alternatively, the extension/retraction of the curtain/camera/lighting may be independent of one another (e.g., the curtain extends/retracts via a separate motor than the motor used to extend/retract the camera/lighting).

Figure 9A:
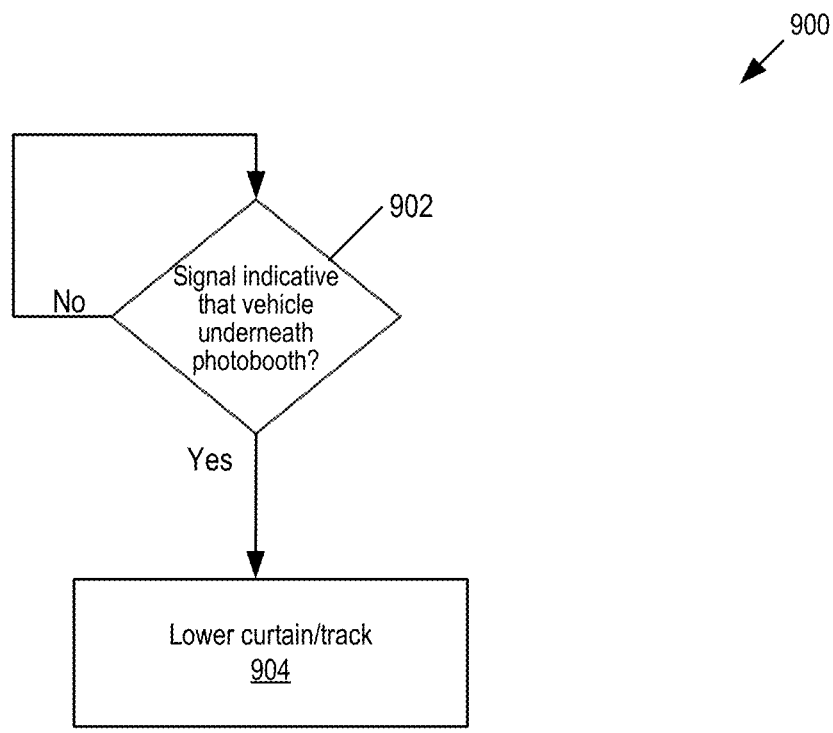
FIG. 9A is a flow diagram for determining whether to lower the curtain and/or track of the photobooth.

Referring to the figures, FIG. 1 shows a perspective view 100 of a first example of the top structure of the photobooth. The top structure includes a non-movable section 102 that is positioned above a vehicle area 110 on the floor of a space. The non-movable section 102 includes one or more sensors 107, 108 that are configured to determine whether the vehicle is positioned within the vehicle area 110. As one example, the vehicle may be driven into the vehicle area 110 along path 109. As such, sensor 108 may first sense the vehicle as it is driven along path 109, after which sensor 107 may sense the vehicle. When both sensors sense the vehicle (indicating that the vehicle is within vehicle area 110), the control electronics may begin to configure the system (e.g., lower the curtain/track, such as illustrated in FIG. 9A). After obtaining the images/videos of the vehicle, the control electronics may cause a signal (such as a sound and/or a light) to be output and/or may cause the curtain/track to be retracted, thereby indicating that the vehicle may be driven along path 109 out of vehicle area 110.

Thus, in one embodiment, responsive to a vehicle being driven into the vehicle area, the curtain and/or track may be extended and responsive to the same vehicle being driven out of the vehicle area, the curtain and/or track may be retracted. In this way, the curtain and/or track may be extended/retracted for every vehicle. Alternatively, the track need not be extended and then retracted every time responsive to a vehicle being driven into and then out of the vehicle area. Rather, the track, in its extended position for obtaining images/videos, may be positioned at a height such that multiple vehicles may be driven into the vehicle area 110 without impacting the track in its extended position.

Further, the non-movable section 102 section may be connected to the ceiling via one or posts 104. The one or more posts 104 may include brackets 106 or the like (e.g., hooks) for connecting the non-movable section 102 to the ceiling.

Figure 2A:
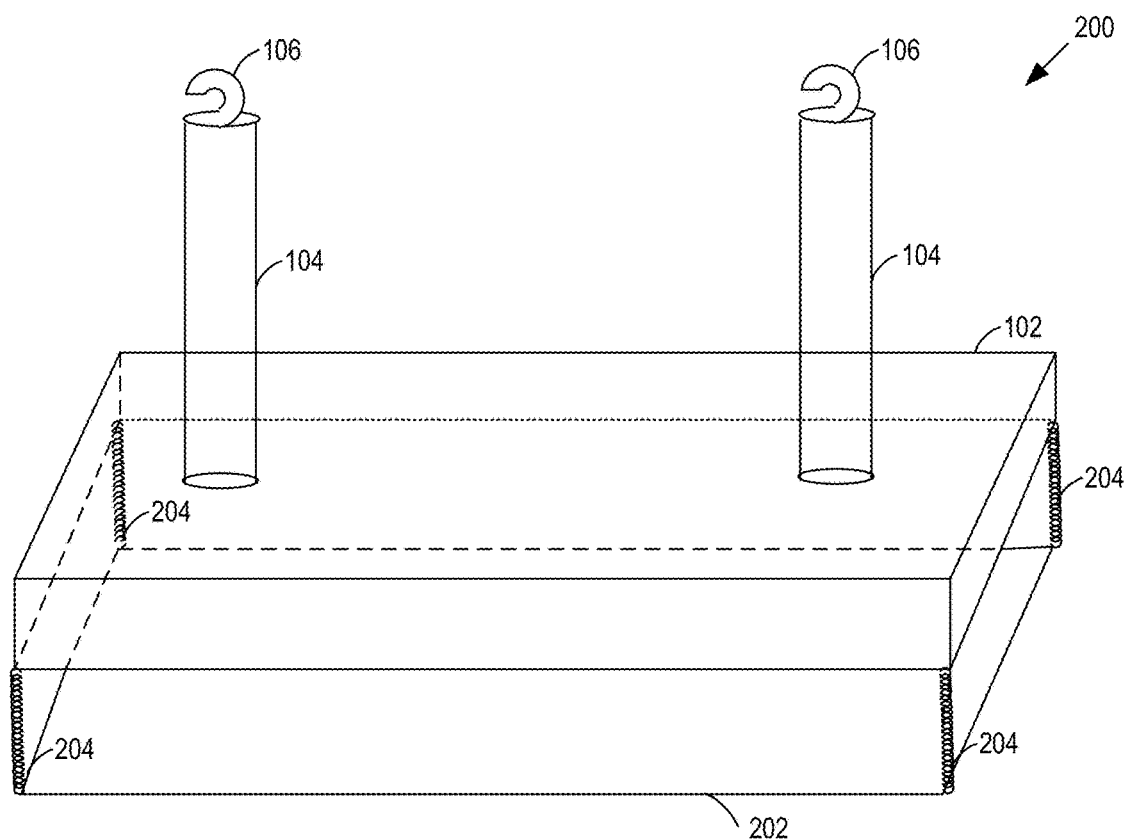
FIG. 2A shows a perspective view of the first example of the top structure of the photobooth in FIG. 1 with a retracted curtain.
Figure 2A:
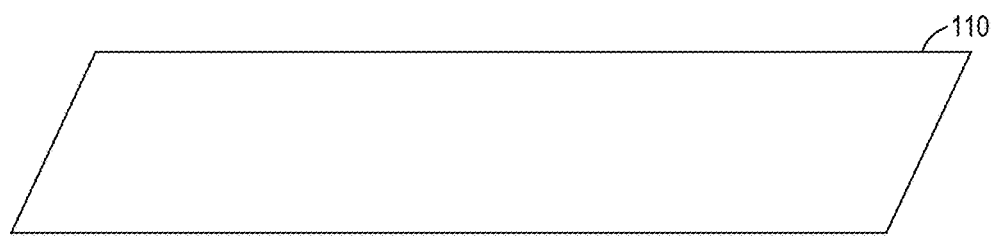
Figure 2B:
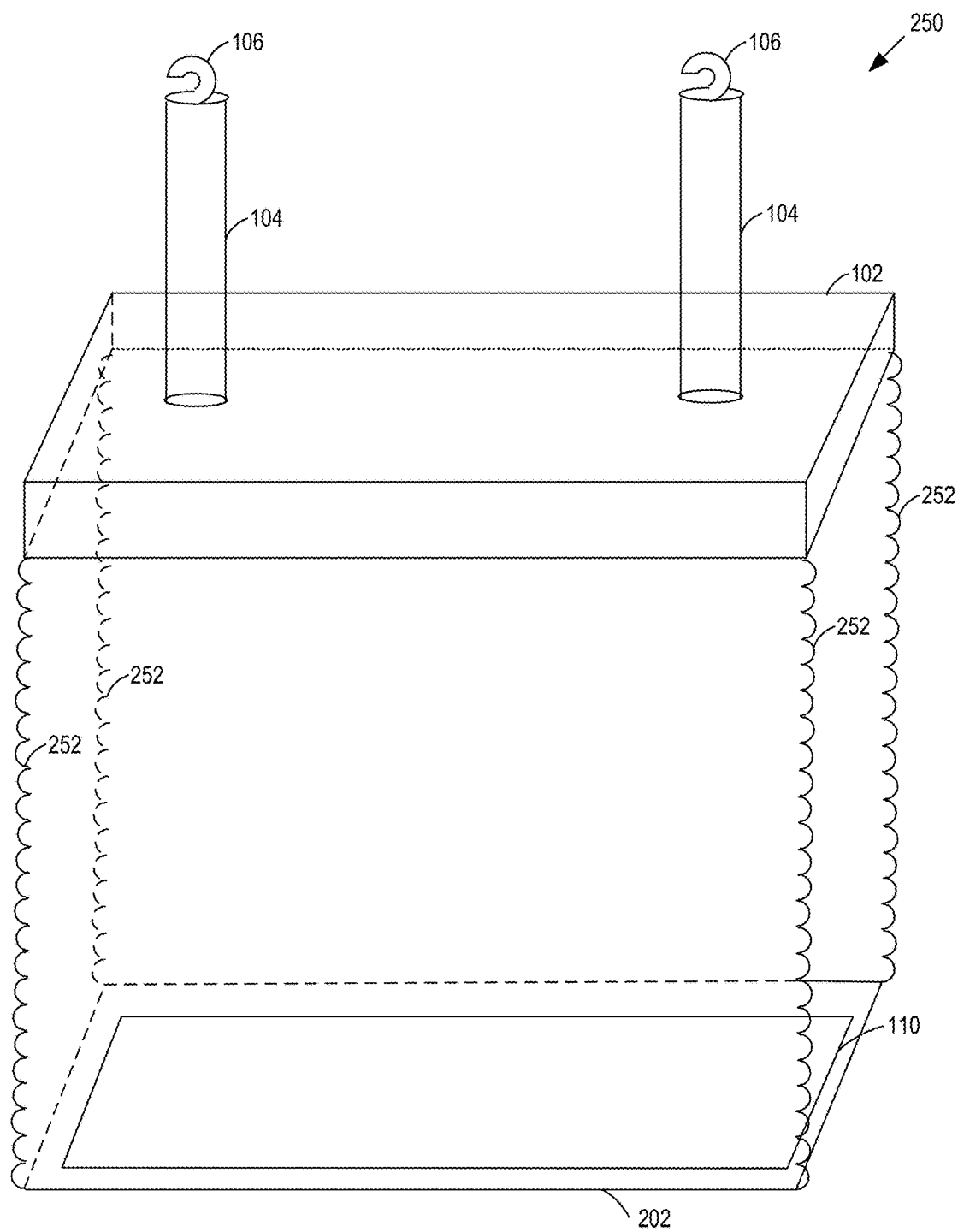
FIG. 2B shows a perspective view of the first example of the top structure of the photobooth in FIG. 1 with an extended curtain.

FIG. 2A shows a perspective view 200 of the first example of the top structure of the photobooth in FIG. 1 with a retracted curtain 202 (as shown by the curtain 202 with folds 204). FIG. 2B shows a perspective view 250 of the first example of the top structure of the photobooth in FIG. 1 with an extended curtain 202 (as shown by the curtain 202 with extended sections 252).

Figure 3A:
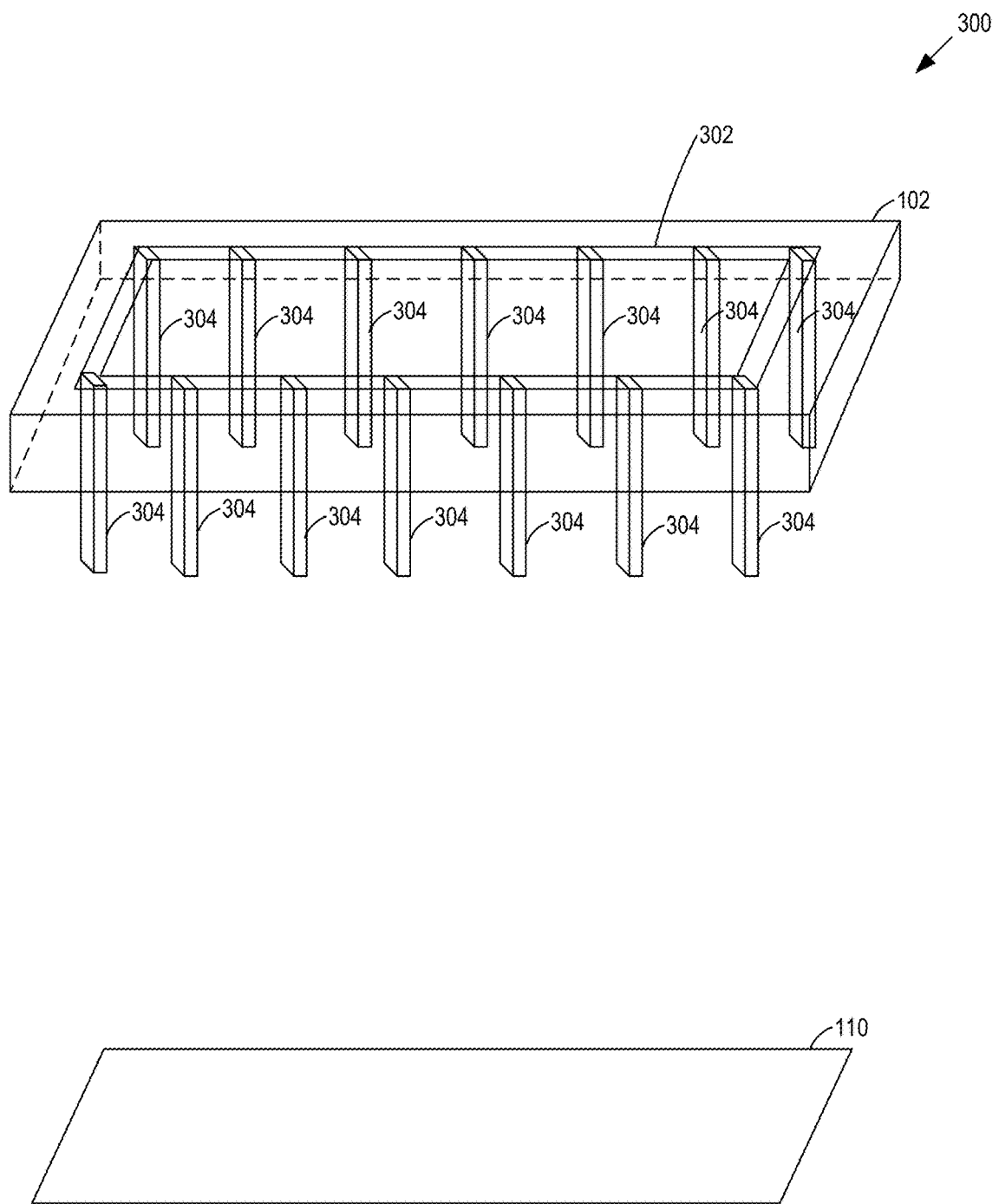
FIG. 3A shows a perspective view of a second example of the top structure with the plurality of support rods retracted.
Figure 3B:
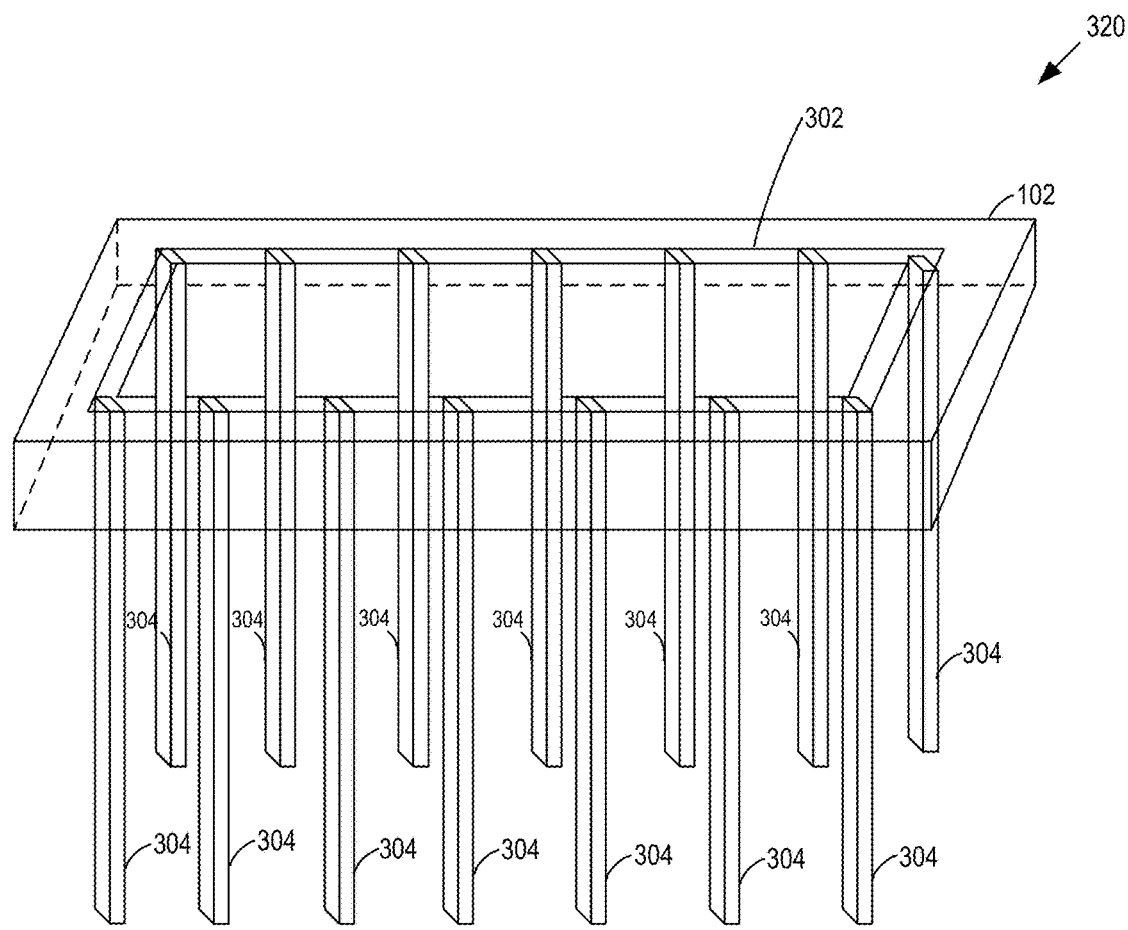
FIG. 3B shows a perspective view of the second example of the top structure with the plurality of support rods extended.
Figure 3B:
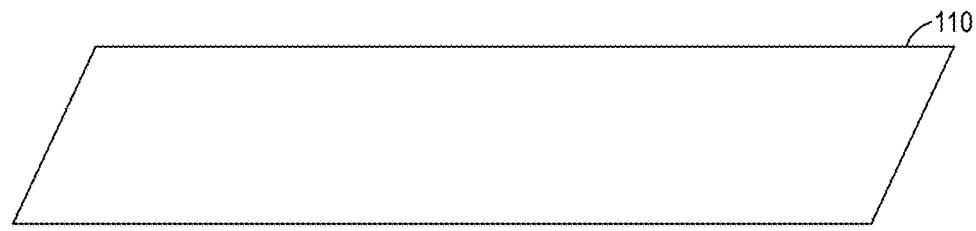

FIG. 3A shows a perspective view 300 of a second example of the top structure with the plurality of support rods 304 retracted (e.g., in the retracted position). The support rods 304 (interchangeably termed posts) are connected to the non-movable section 102 at one end (e.g., a connection end). In one or some embodiments, the support rods 304 are connected directly to the non-movable section 102. Alternatively, the support rods 304 are connected indirectly to the non-movable section 102 (e.g., the support rods 304 are connected to bracing 302, which is connected to or a part of the non-movable section 102). In particular, non-movable section 102 may include bracing 302, to which the support rods 304 may be connected. FIG. 3B shows a perspective view 320 of the second example of the top structure with the plurality of support rods 304 extended. As shown in FIG. 3B, the plurality of support rods 304 are extended (e.g., in the extended position) in unison at a same extension from the non-movable section 102. Alternatively, one, some, or all of the plurality of support rods 304 may be individually extendable or retractable.

Figure 3C:
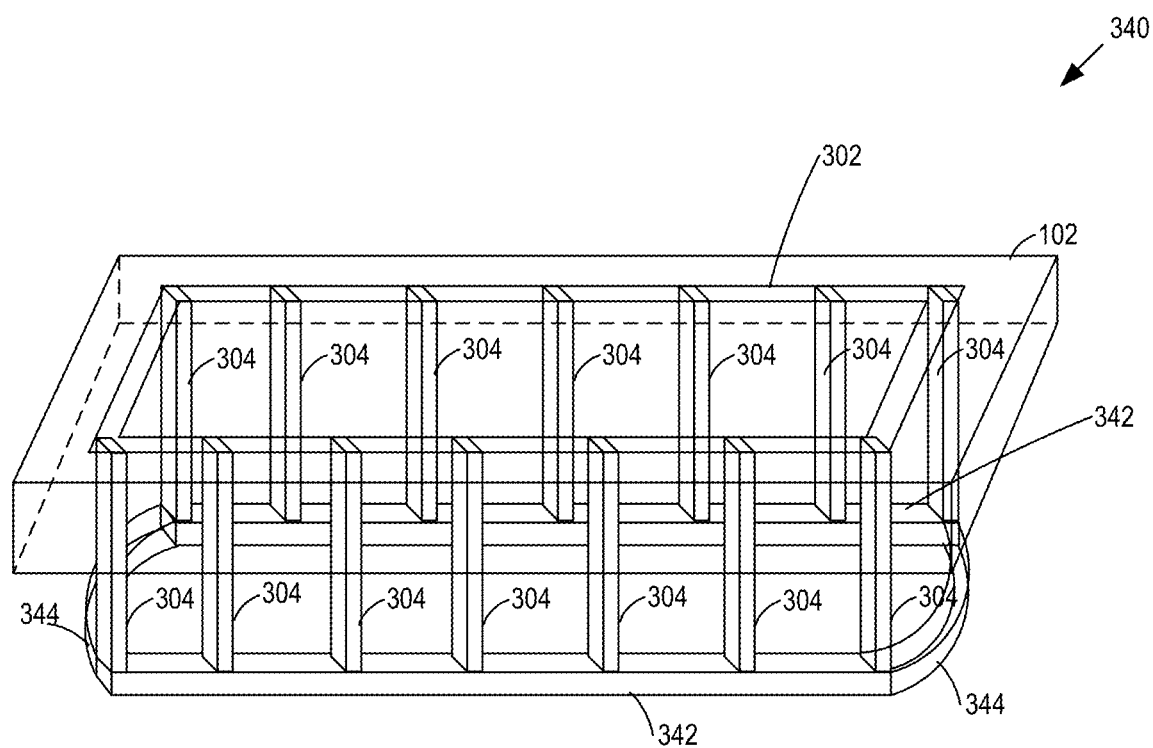
FIG. 3C shows a perspective view of the second example of the top structure with the plurality of support rods retracted, with a track attached to the support rods.
Figure 3C:
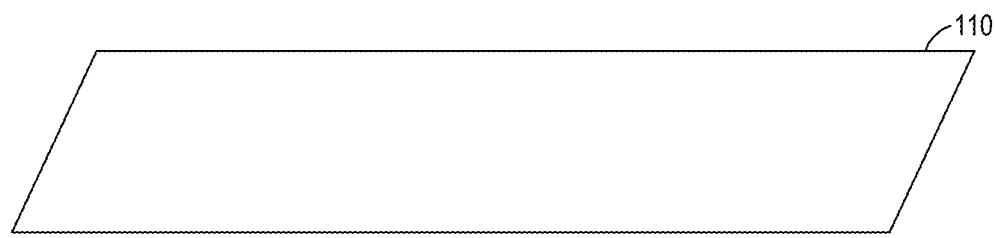
Figure 3D:
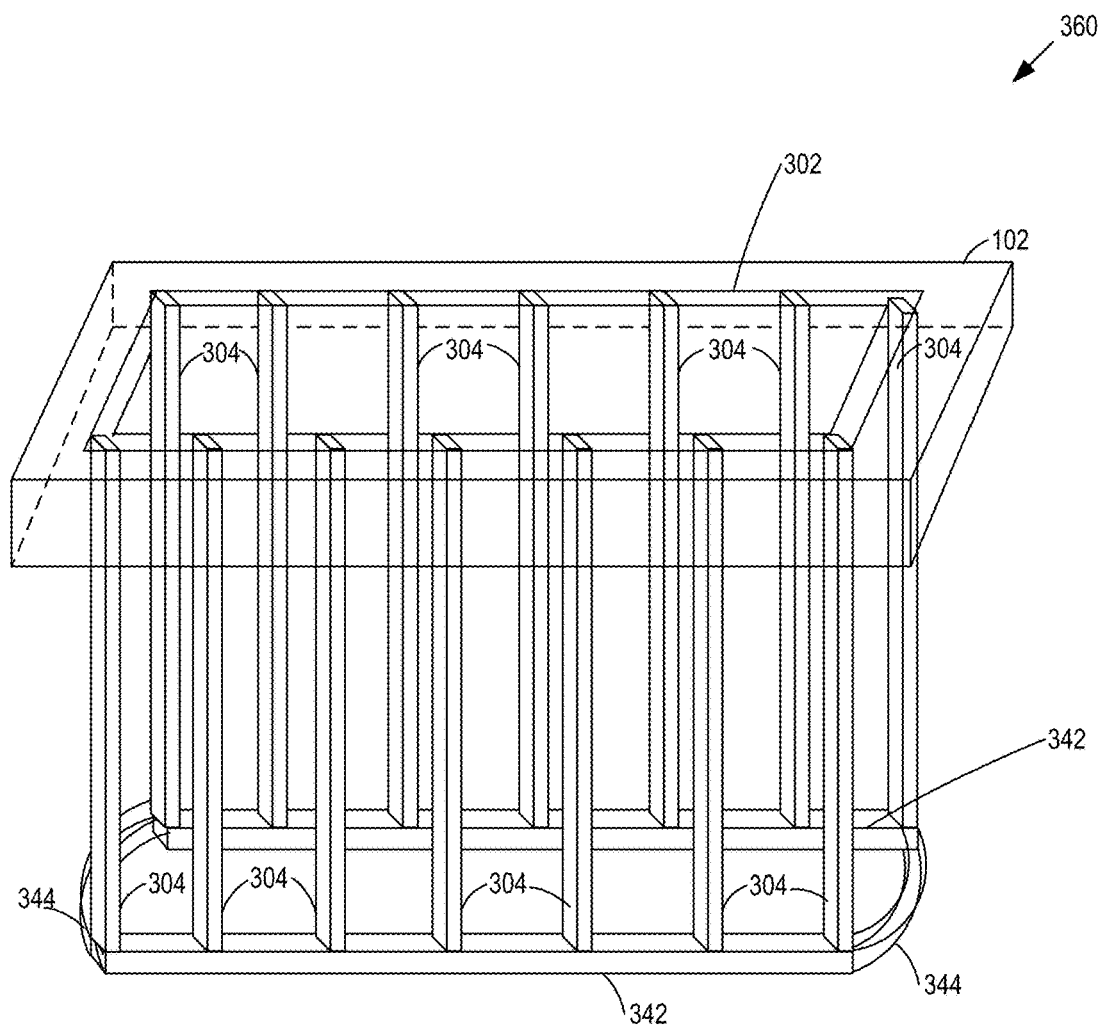
FIG. 3D shows a perspective view of the second example of the top structure with the plurality of support rods extended, with a track attached to the support rods.
Figure 3D:
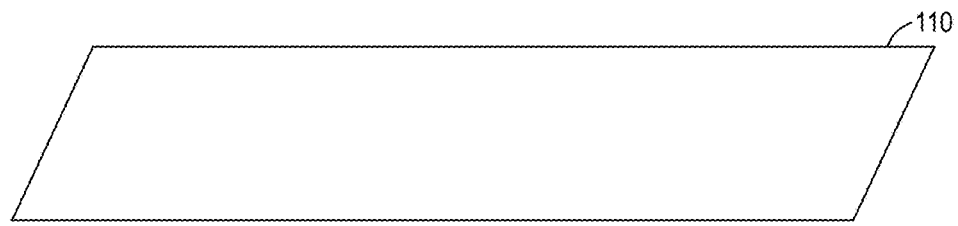

FIG. 3C shows a perspective view 340 of the second example of the top structure with the plurality of support rods 304 retracted, with a track attached to the support rods 304. As such, FIG. 3C illustrates an example of the movable portion in the retracted position. The track may comprise a unitary piece attached to an end of the plurality of support rods 304. Alternatively, the track may comprise multiple sections, such as sections 342, 344. As shown, support rods 304 are connected to the track at an end (termed an opposite end) opposite to the connection end (the end that connects to the non-movable section 102). In this regard, in one or some embodiments, the track is connected closer to the opposite end and further away from the connection end. As discussed above, the track may rigidize the plurality of support rods 304. FIG. 3D shows a perspective view 360 of the second example of the top structure with the plurality of support rods 304 extended, with a track attached to the support rods 304. As such, FIG. 3D illustrates an example of the movable portion in the extended position. Further, as shown, the structure includes at least four support rods 304, which are positioned such that they are evenly distributed around a vehicle located on the ground below.

Figure 3E:
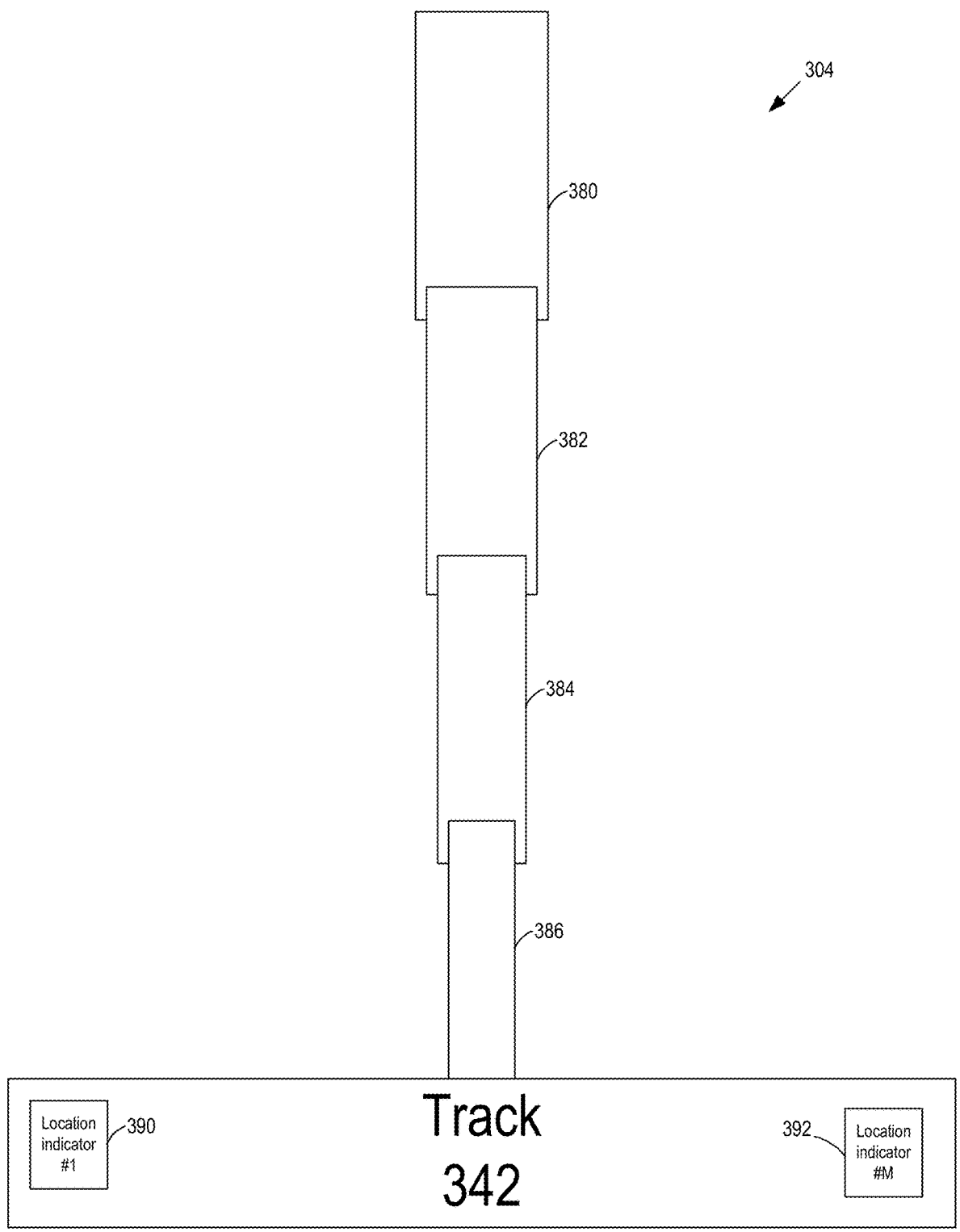
FIG. 3E shows a focused view of the extended support rods and the track.

FIG. 3E shows a focused view of the extended support rod 304 and a section 342 of the track. As shown, the support rod may be telescoping and may be comprised of multiple sections 380, 382, 384, 386, with section 386 connected to section 342 of the track. The section 342 of the track may include one or more location indicators, such as location indicator #1 (390) and location indicator #2 (392). The one or more location indicators may comprise sensors, bar codes, or other location means in which to identify the location of the rolling structure, discussed below. In one embodiment, the one or more location indicators may comprise sensors that may generate sensor data in response to contact with the rolling structure, thereby providing location information for the rolling structure. Alternatively, the one or more location indicators may passive (such as a bar code) in order for a sensor or the like resident on the rolling structure to identify its position along the section 342 of the track.

Figure 4:
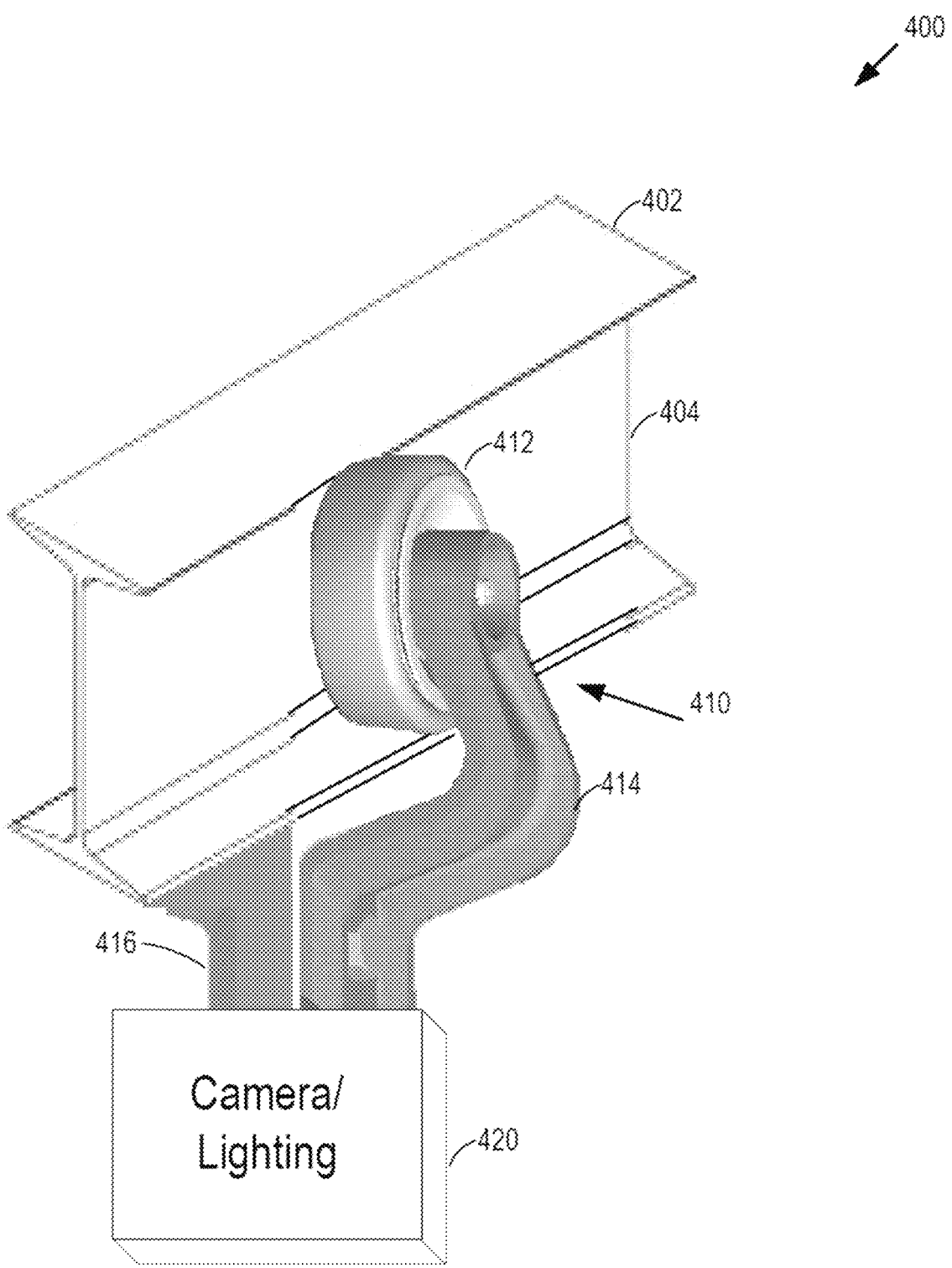
FIG. 4 shows an example of an I-beam track and a rolling structure to mate with the I-beam track to move the camera/lighting along the I-beam track.

FIG. 4 shows an illustration 400 of an I-beam track 402 and a rolling structure 410 to mate with the I-beam track 402 to move the camera/lighting 420 along the I-beam track 402. As shown, the rolling structure 410 includes one or more connectors 414, 416 to connect the rolling structure 410 to the camera/lighting 420. Further, the rolling structure 410 includes one or more wheels 412, such as a wheel attached to each of connectors 414, 416, with the wheels 412 rolling along a wall 404 of the I-beam track 402. In an alternate embodiment, multiple camera/lighting 420 may be permanently affixed at predetermined positions along the I-beam track 402. In particular, the multiple camera/lighting 420 are not dynamically moved along the track to obtain images. Rather, the multiple camera/lighting 420 are permanently positioned with respect to the I-beam track 402 to obtain predetermined views of the vehicle. Thus, the camera and/or lighting may be connected directly to the track. Alternatively, the camera and/or lighting may be positioned at or substantially at the opposite end of each of the plurality of posts. In this regard, the camera and/or lighting may be affixed to one or more of the plurality of posts or to the track.

Figure 5:
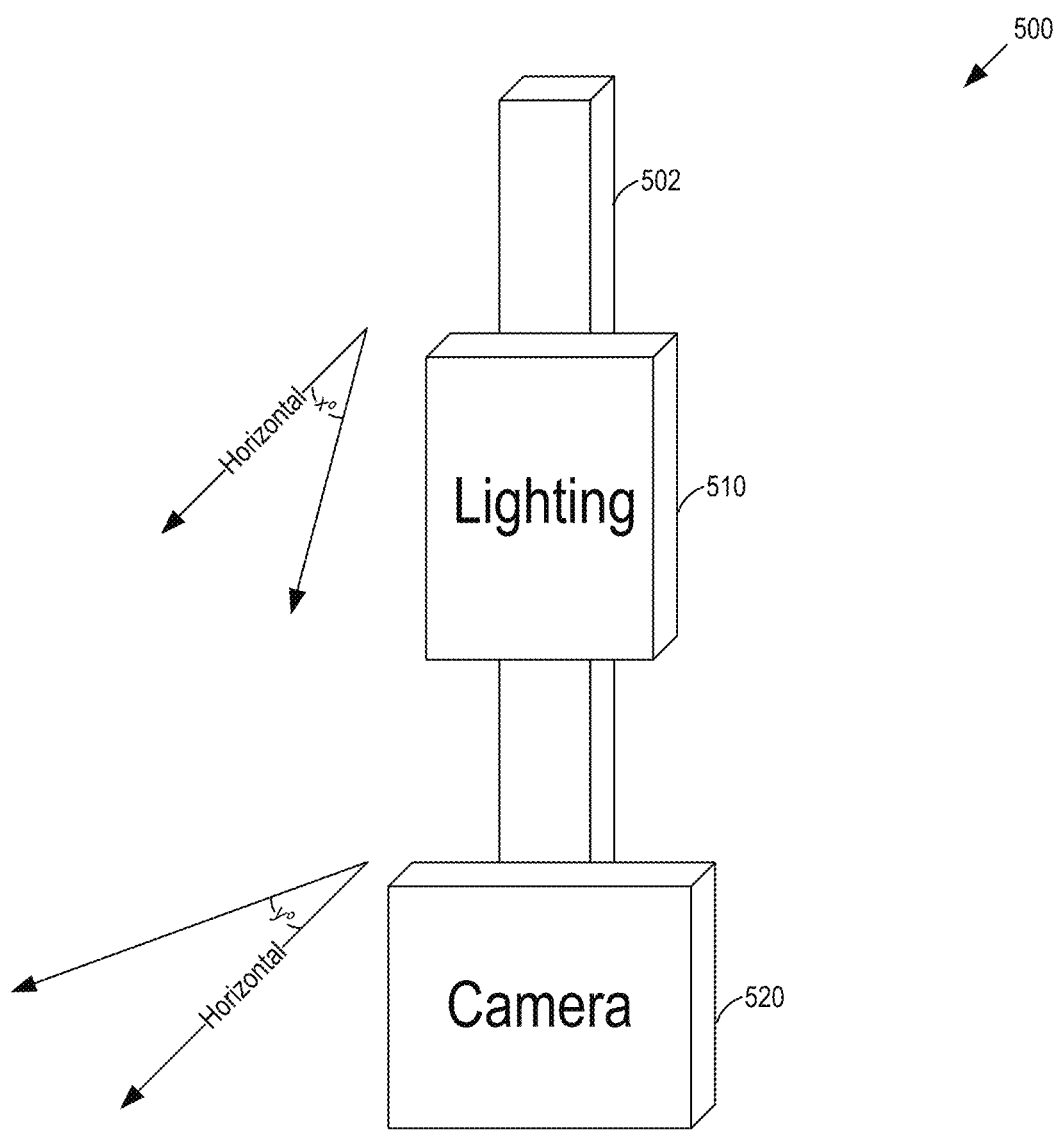
FIG. 5 is a block diagram of the positioning of the lighting relative to the camera as the camera/lighting move along the track.

FIG. 5 is a block diagram 500 of the positioning of the lighting 510 relative to the camera 520 via post 502 as the camera/lighting (e.g., a camera/lighting combination) move along the track. Lighting of a vehicle, such as a vehicle with metallic paint, may be difficult, particularly due to reflection. Thus, the precise placement of the lighting 510 relative to the camera 520 may assist in obtaining images or videos with less or no reflection. As such, the lighting 510 may be positioned on post 502 closer to the ceiling (when the suspended photobooth is attached to the ceiling) such that a central axis of the lighting is positioned downward from the horizontal at X° and the camera 520 may be positioned on post 502 further away from the ceiling (when the suspended photobooth is attached to the ceiling) such that a central axis of the lighting is positioned downward from the horizontal at Y°. In one or some embodiments, X° is greater than Y° in order to reduce the glare from the lighting. Further, in one or some embodiments, the controller (e.g., processor 744 discussed below) may be configured to control one or more motors (not shown) to adjust an angle of the camera 520 in the camera/lighting combination independently of an angle of the lighting 510 in the camera/lighting combination. In particular, the angle selected for the camera 520 may be different from the angle selected for the lighting 510. Alternatively, the controller may control the one or more motors to adjust the angle of the camera 520 in the camera/lighting combination and the angle of the lighting 510 in the camera/lighting combination in unison. Thus, the lighting 510 may be positioned in fixed relation to the camera 520.

Figure 6A:
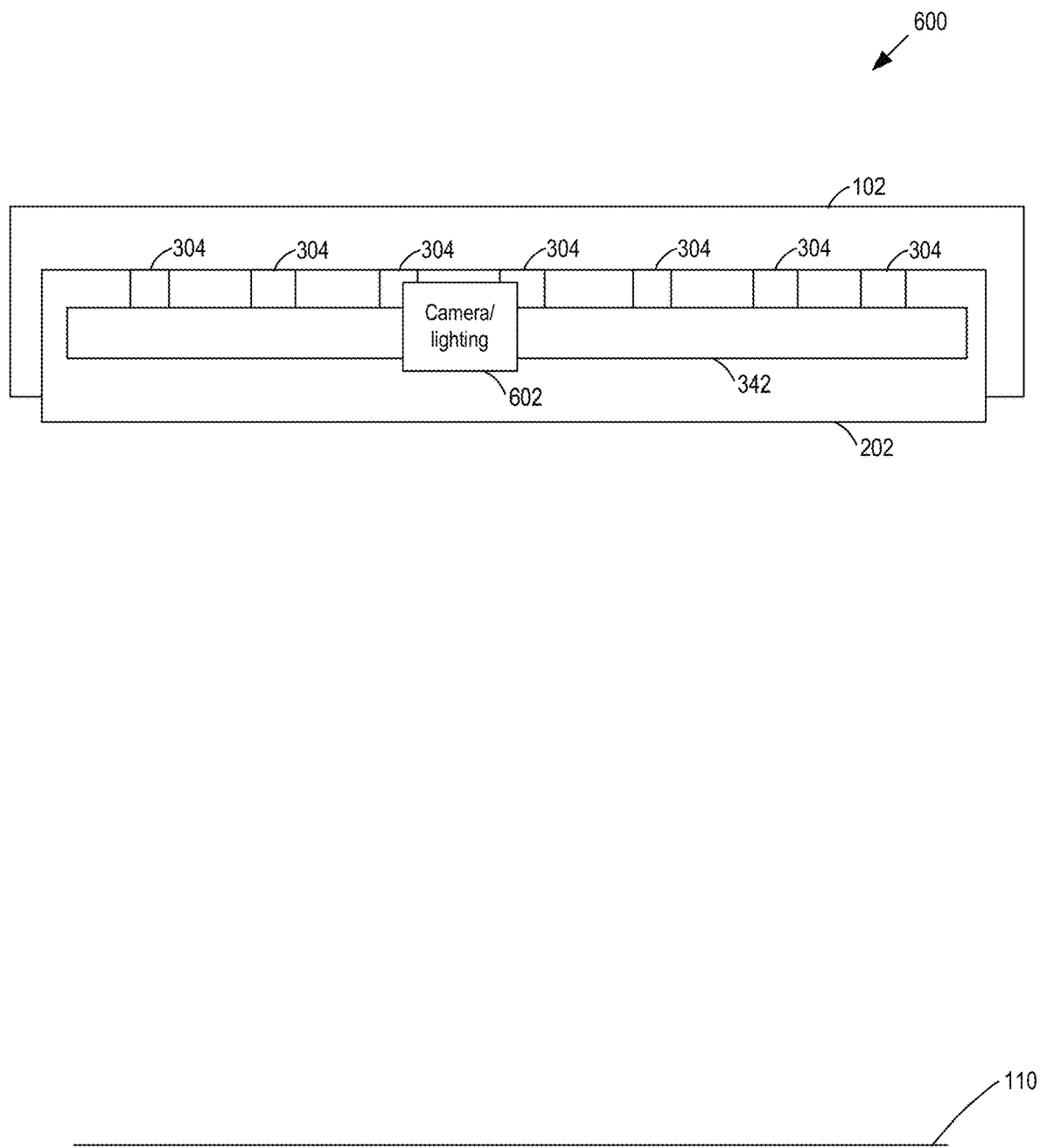
FIG. 6A is a side view of the curtain retracted, the support rods retracted, the track, and the camera/lighting.
Figure 6B:
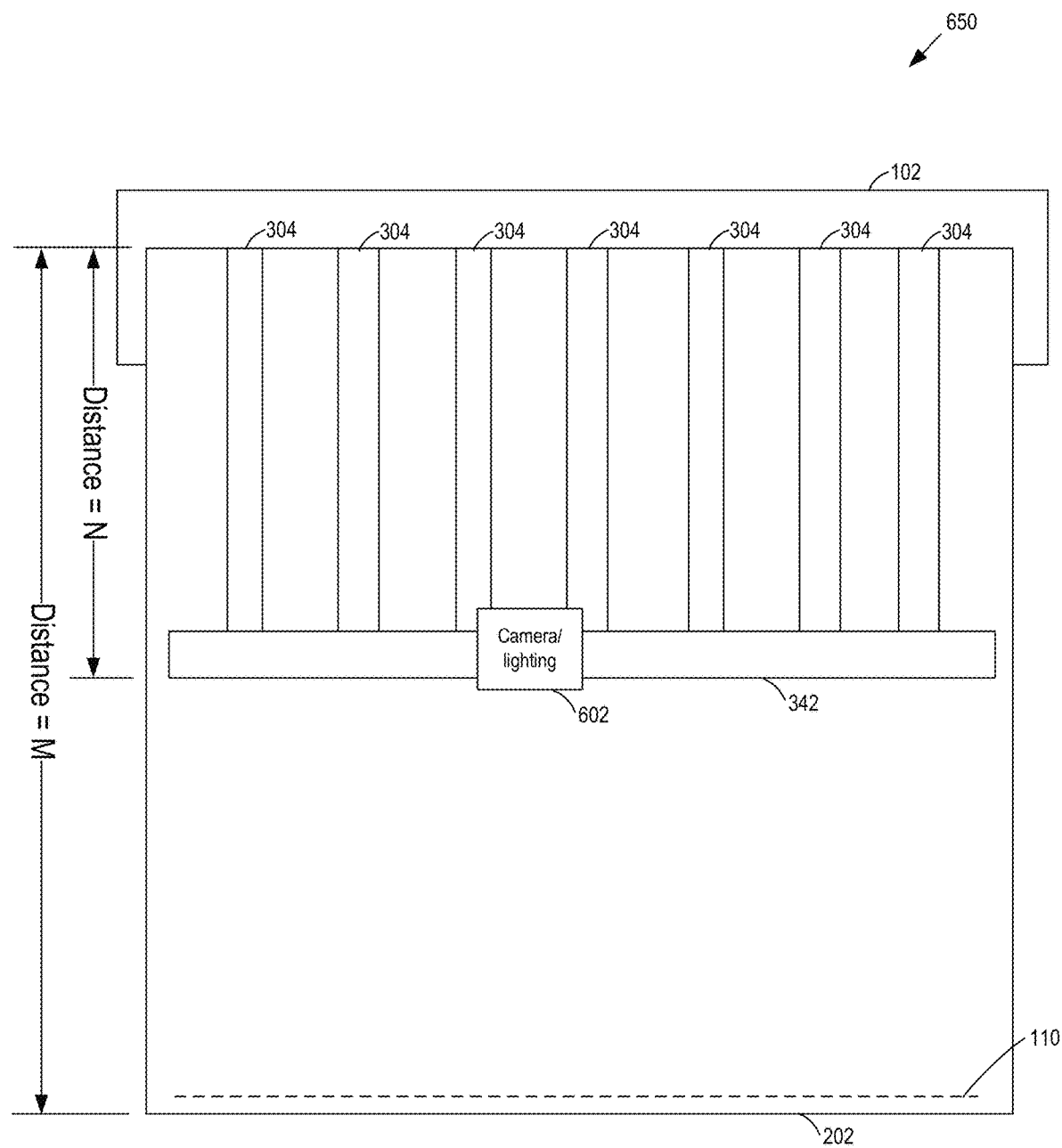
FIG. 6B is a side view of the curtain extended, the support rods extended, the track, and the camera/lighting.

FIG. 6A is a side view 600 of the curtain 202 retracted, the support rods 304 retracted, the section 342 of the track, and the camera/lighting 602. FIG. 6B is a side view 650 of the curtain 202 extended, the support rods 304 extended, the section 342 of the track, and the camera/lighting 602. As shown, the section 342 of the track extends a distance=N from the non-movable section 102 whereas the curtain 202 extends further downward (e.g., at or proximate to the floor) a distance=M from the non-movable section 102. As discussed above, a common motor (or common set of motors) may use gearing to move the curtain 202 and support rods 304 in combination. Alternatively, separate motors (or separate motor controls using a common motor) may move the curtain 202 and support rods 304 independently of one another. In this regard, the controller may be configured to independently control movement of the end of each of the plurality of posts away from the ceiling and an end of the curtain away from the ceiling.

Figure 7:
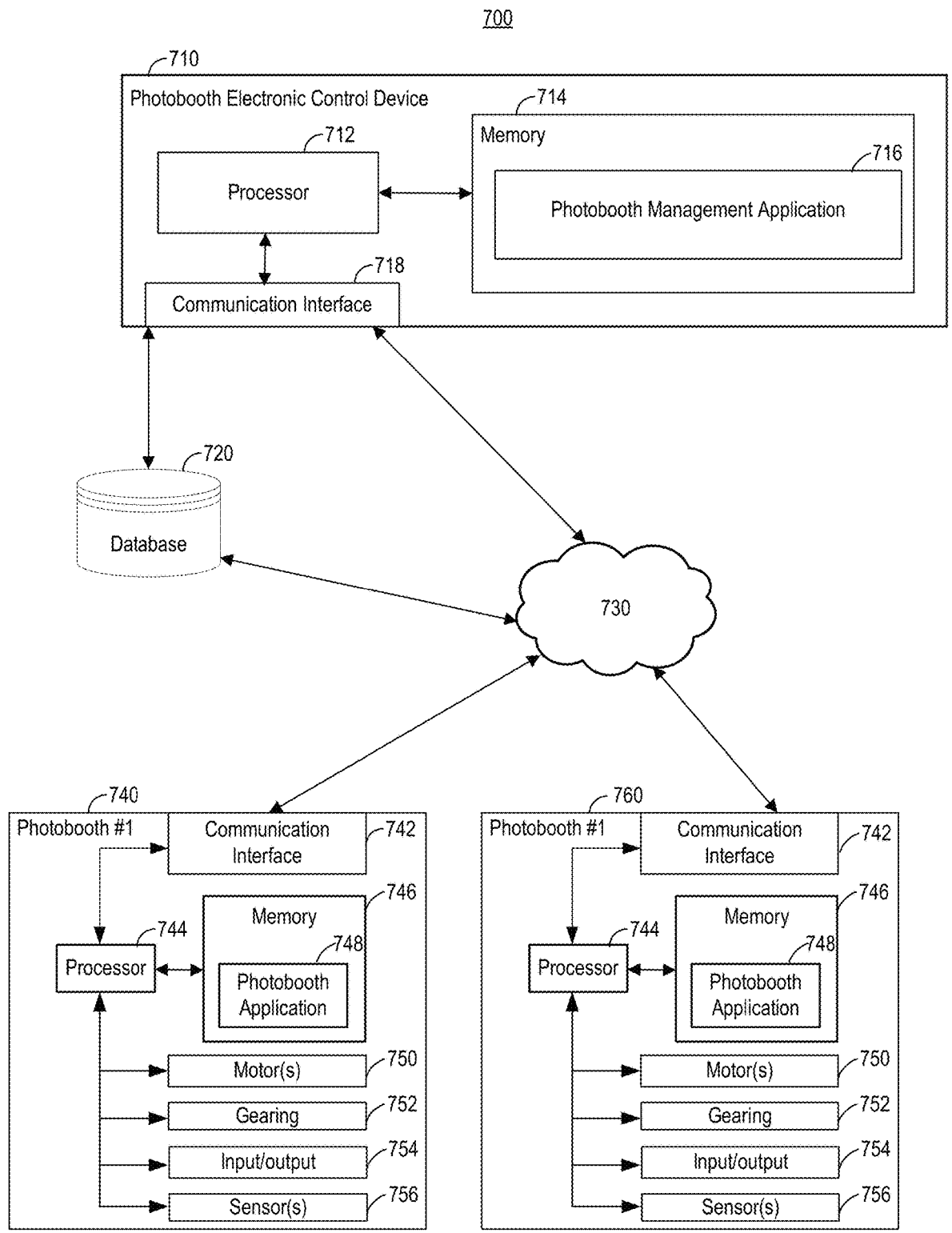
FIG. 7 illustrates an example of a photobooth control system, which includes a photobooth electronic control device communicating with a plurality of photobooths.

FIG. 7 illustrates an example of a photobooth electronic control system 700, which includes a photobooth electronic control device 710 communicating with a plurality of photobooths (photobooth #1 (740), photobooth #N (760)). Photobooth electronic control device 710 is configured to include the hardware, software, firmware, and/or middleware for operating the photobooth management application 716. Photobooth electronic control device 710 is shown to include a processor 712, a memory 714, and a communication interface 718. As discussed below with regard to FIG. 8, various types of processors and memories are contemplated. The photobooth management application 716 is described in terms of functionality to interact with a plurality of photobooths, such as photobooth #1 (740) to photobooth #N (760). As one example, photobooth management application 716 may be configured to perform any one, any combination, or all of: (1) receiving images generated from the plurality of photobooths; and (2) remote control of one, some, or all of the plurality of photobooths (to the extent the photobooths are not locally controlled). Though photobooth management application 716 is illustrated as resident in memory 714, photobooth management application 716 may be a representation of software, hardware, firmware, and/or middleware configured to implement monitoring of the mobile devices.

The photobooth electronic control system 700 may further include a database 720 for storing data for use by the photobooth management application 716. For example, data directed to images/videos generated by the plurality of photobooths may be stored in database 720.

The photobooth electronic control device 710 may communicate with the database 740 directly to access the data. Alternatively, the photobooth electronic control device 710 may also communicate with the database 720 via network 730 (e.g., the Internet). Though FIG. 7 illustrates direct and indirect communication, in one implementation, only direct communication is used, in an alternate implementation, only indirect communication is used, and still in an alternate implementation, both direct and indirect communication is used.

The photobooth electronic control device 710 may communicate with any number and type of communication devices via network 730. For example, photobooth electronic control device 710 may communicate with one or more photobooths, such as photobooth #1 (740) to photobooth #N (760).

Photobooth #1 (740) to photobooth #N (760) includes communication interface 742, processor 744, memory 746, motor(s) 750, gearing 752, input/output device(s) 754, and sensor(s) 756 (e.g., sensors to sense whether the vehicle is within vehicle area 110). Processor 744 is one example of a controller that is configured to control operations of the photobooth. Communication interface 742 may comprise a wireless communication interface configured to communicate wirelessly, such as cellular, Wi-Fi, Bluetooth, or the like. In this regard, communication interface 742 may include one or more wireless transceivers configured to communicate via one or more wireless protocols, such as discussed in further detail below. Memory 746 may include software, such as photobooth application 748. The memory 746 illustrated may comprise a single memory or may comprise multiple memories (such as multiple types of memories). As discussed further below with regard to FIGS. 9A-B, the photobooth may manage one or more aspects of its control. Input/output device(s) 754 may comprise any type of input and/or output device, such as a display (e.g., a touchscreen display), a speaker, a keyboard, or the like. Input/output device(s) 754 is an example of an input interface through which to control the respective photobooth.

Figure 8:
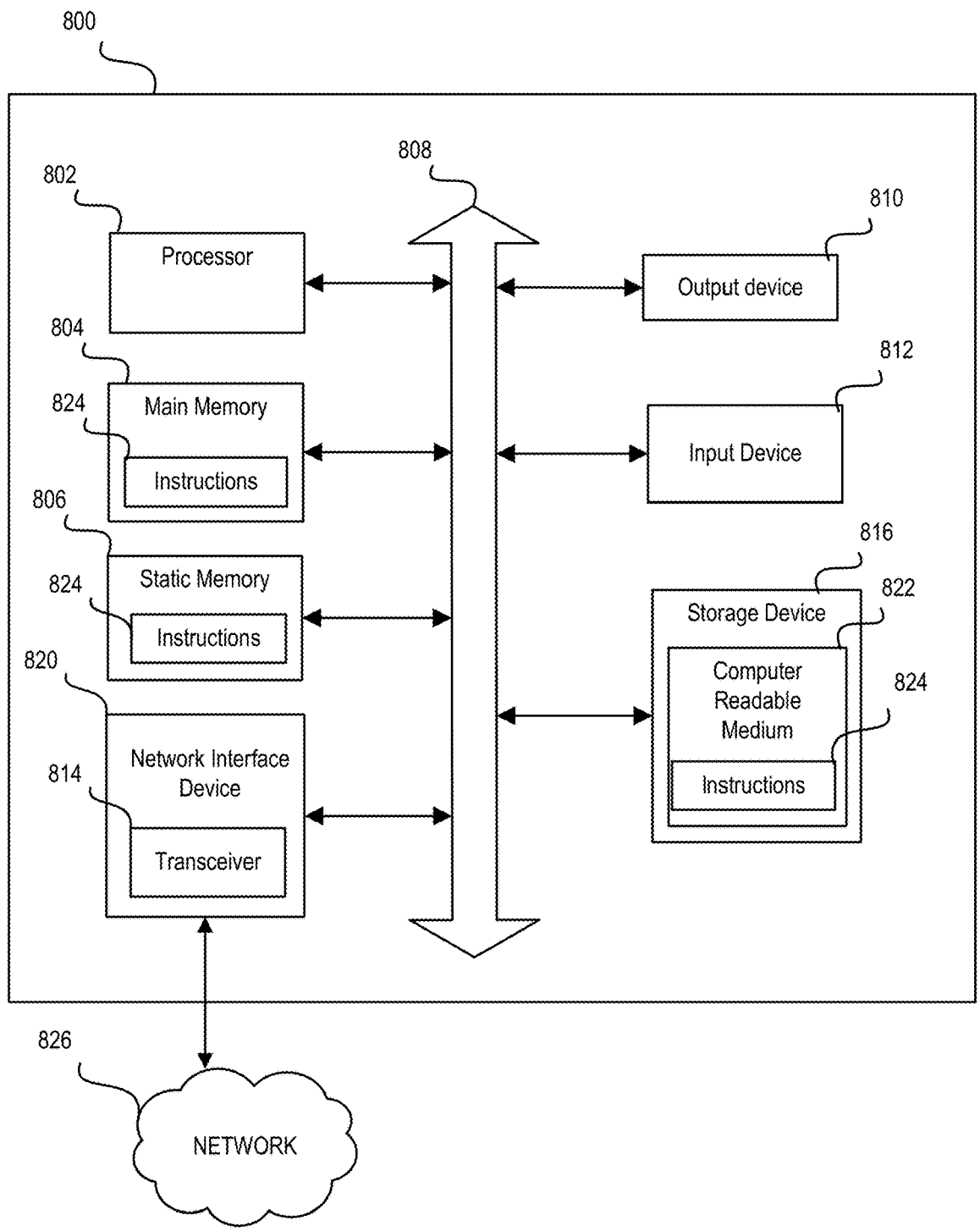
FIG. 8 illustrates a block diagram of exemplary computer architecture for a device in the exemplary system of FIG. 7.

FIG. 8 illustrates a block diagram of exemplary computer system 800 for the electronic device of FIG. 7. Computer system 800 thus includes a network interface 820 that allows communication with other computers via a network 826, where network 826 may be represented by network interface 820 in FIG. 8. Network 826 may be any suitable network and may support any appropriate protocol suitable for communication to computer system 800. In an implementation, network 826 may support wireless communications. In another implementation, network 826 may support hard-wired communications, such as a telephone line or cable. In another implementation, network 826 may support the Ethernet IEEE (Institute of Electrical and Electronics Engineers) 802.3x specification. In another implementation, network 826 may be the Internet and may support IP (Internet Protocol). In another implementation, network 826 may be a LAN or a WAN. In another implementation, network 826 may be a hotspot service provider network. In another implementation, network 826 may be an intranet. In another implementation, network 826 may be a GPRS (General Packet Radio Service) network. In another implementation, network 826 may be any appropriate cellular data network or cell-based radio network technology. In another implementation, network 826 may be an IEEE 802.11 wireless network. In still another implementation, network 826 may be any suitable network or combination of networks. Although one network 826 is shown in FIG. 8, network 826 may be representative of any number of networks (of the same or different types) that may be utilized.

Generally speaking, logic circuitry, such as a controller, may control various electronic devices discussed herein. Computer system 800 is one manifestation of the logic circuitry. The controller may include embedded memory and/or interact with external memory, and can take one of several forms, one of which is a processor 802 and memory (e.g., main memory 804, a static memory 806), with other forms including processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller can be configured with hardware and/or firmware to perform the various functions described below and shown in the flow diagrams. Thus, the computer system 800 may also include a processor 802, a main memory 804, a static memory 806, an output device 810 (e.g., a display or speaker), an input device 812, and a storage device 816, communicating via a bus 808.

Processor 802 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 802 executes instructions 824 stored on one or more of the main memory 804, static memory 806, or storage device 815. Processor 802 may also include portions of the computer system 800 that control the operation of the entire computer system 800. Processor 802 may also represent a controller that organizes data and program storage in memory and transfers data and other information between the various parts of the computer system 800.

Processor 802 is configured to receive input data and/or user commands through input device 812. Input device 812 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 800 and control operation of computer system 800 and/or operation of the inventory control application 1016. Input device 812 as illustrated in FIG. 8 may be representative of any number and type of input devices.

Processor 802 may also communicate with other computer systems via network 826 to receive instructions 824, where processor 802 may control the storage of such instructions 824 into any one or more of the main memory 804 (e.g., random access memory (RAM)), static memory 806 (e.g., read only memory (ROM)), or the storage device 816. Processor 802 may then read and execute instructions 824 from any one or more of the main memory 804, static memory 806, or storage device 816. The instructions 824 may also be stored onto any one or more of the main memory 804, static memory 806, or storage device 816 through other sources. The instructions 824 may correspond to, for example, instructions for the photobooth application 748 or the photobooth management application 716 illustrated in FIG. 7.

Although computer system 800 is represented in FIG. 8 as a single processor 802 and a single bus 808, the disclosed implementations applies equally to computer systems that may have multiple processors and to computer systems that may have multiple busses with some or all performing different functions in different ways.

Storage device 816 represents one or more mechanisms for storing data. For example, storage device 816 may include a computer readable medium 822 such as read-only memory (ROM), RAM, non-volatile storage media, optical storage media, flash memory devices, and/or other machine-readable media. In other implementations, any appropriate type of storage device may be used. Although only one storage device 816 is shown, multiple storage devices and multiple types of storage devices may be present. Further, although computer system 800 is drawn to contain the storage device 816, it may be distributed across other computer systems that are in communication with computer system 800, such as a server in communication with computer system 800.

Storage device 816 may include a controller (not shown) and a computer readable medium 822 having instructions 824 capable of being executed by processor 802 to carry out functions of the photobooth application 748 and/or the photobooth management application 716. In another implementation, some or all of the functions are carried out via hardware in lieu of a processor-based system. In one implementation, the controller included in storage device 816 is a web application browser, but in other implementations the controller may be a database system, a file system, an electronic mail system, a media manager, an image manager, or may include any other functions capable of accessing data items. Storage device 816 may also contain additional software and data (not shown), for implementing described features.

Output device 810 is configured to present information to the user. For example, output device 810 may be a display such as a liquid crystal display (LCD), a gas or plasma-based flat-panel display, or a traditional cathode-ray tube (CRT) display or other well-known type of display in the art of computer hardware. Accordingly, in some implementations output device 810 displays a user interface. In other implementations, output device 810 may be a speaker configured to output audible information to the user. In still other implementations, any combination of output devices may be represented by the output device 810.

Network interface 820 provides the computer system 800 with connectivity to the network 826 through any compatible communications protocol. Network interface 820 sends and/or receives data from the network 826 via a wireless or wired transceiver 814. Transceiver 814 may be a cellular frequency, radio frequency (RF), infrared (IR) or any of a number of known wireless or wired transmission systems capable of communicating with network 826 or other computer device having some or all of the features of computer system 800. Bus 808 may represent one or more busses, e.g., USB, PCI, ISA (Industry Standard Architecture), X-Bus, EISA (Extended Industry Standard Architecture), or any other appropriate bus and/or bridge (also called a bus controller). Network interface 820 as illustrated in FIG. 8 may be representative of a single network interface card configured to communicate with one or more different data sources.

Computer system 800 may be implemented using any suitable hardware and/or software, such as a personal computer or other electronic computing device. In addition, computer system 800 may also be a portable computer, laptop, tablet or notebook computer, PDA, pocket computer, appliance, telephone, server computer device, or mainframe computer.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

FIG. 9A is a flow diagram 900 for determining whether to lower the curtain and/or track of the photobooth. At 902, it is determined whether there is a signal indicative that the vehicle is underneath the photobooth. For example, one or more sensors, such as sensors 107, 108, may generate data indicative that the vehicle is underneath the photobooth, as discussed above. In response thereto, at 904, the curtain and/or track may be lowered. In addition, the curtain and/or track may be retracted. In one embodiment, the curtain and/or track may be retracted responsive to the vehicle driving out of vehicle area 110. Alternatively, the track may remain in the extended position when obtaining images and/or videos of different vehicles.

Figure 9B:
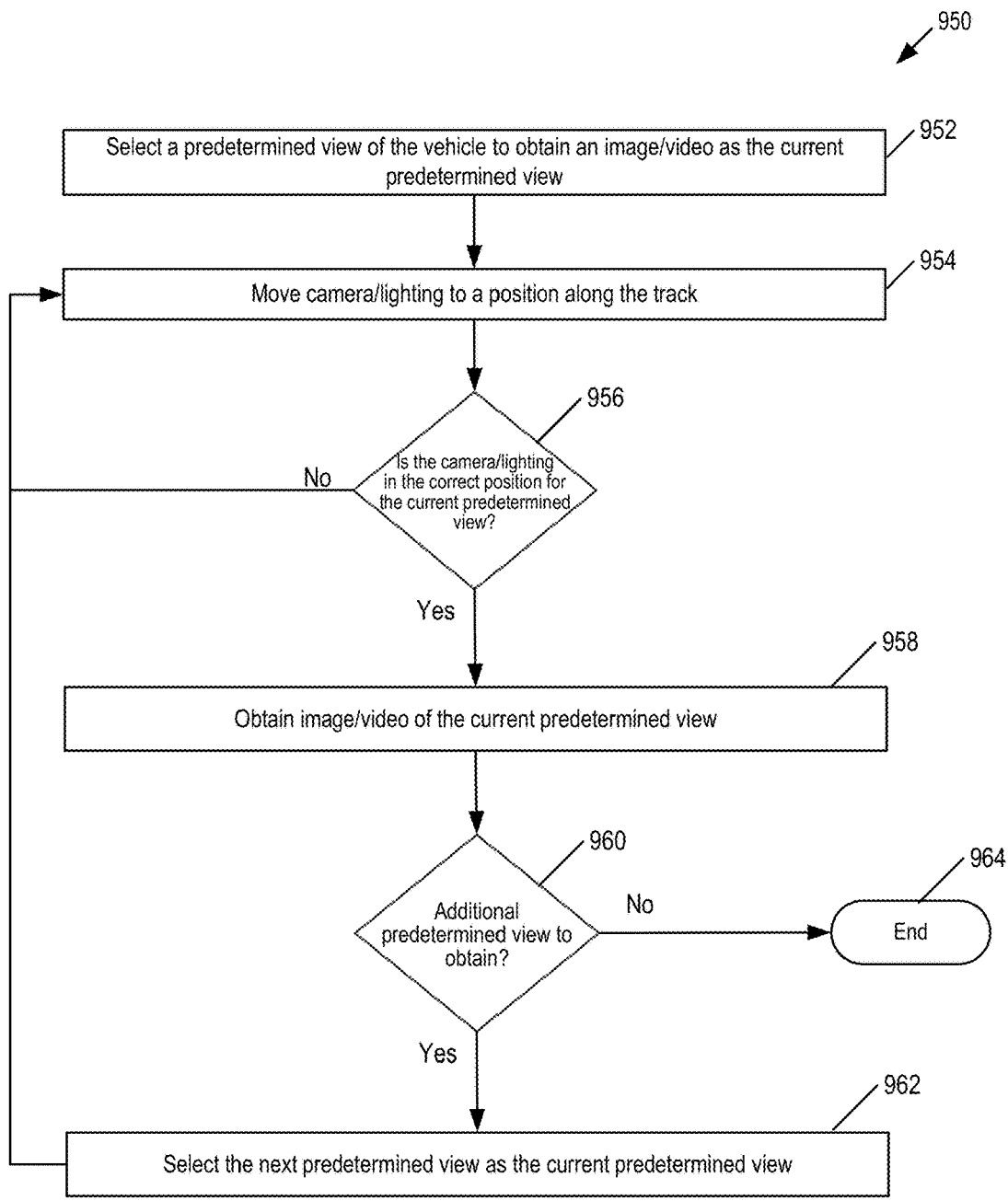
FIG. 9B is a flow diagram for moving the camera/lighting to predetermined positions along the track in order to obtain images/videos from predetermined views.

FIG. 9B is a flow diagram 950 for moving the camera/lighting to predetermined positions along the track in order to obtain images/videos from predetermined views. At 952, a predetermined view of the vehicle to obtain an image and/or video is selected as the current predetermined view. At 954, the camera and/or lighting is moved to a position along the track. As discussed above, due to the camera/lighting moving along the track, less cameras/lights need be used. For example, only a single camera/lighting combination need be included and moved along the track in order to obtain images and/or videos at different perspectives of the vehicle. Alternatively, multiple camera/lighting combinations may be placed at different predetermined positions (e.g., a front camera/light positioned on the track such that when the track is extended, the front camera/light obtains an image of a front view of the vehicle; a driver's side camera/light positioned on the track such that when the track is extended, the driver's side camera/light obtains an image of a front view of the vehicle; etc.). With multiple camera/lighting combinations, the camera/lighting combinations need not be moved along the track with the images obtained simultaneously (or near simultaneously).

At 956, it is determined whether the camera/lighting combination is in the correct position for the current predetermined view. If not, flow diagram 950 loops back to 954 in order to reposition the camera/lighting combination. If so, at 958, the image and/or video of the current predetermined view is obtained. At 960, it is determined whether there is an additional predetermined view to obtain. If so, at 962, the next predetermined view is selected as the current predetermined view and flow diagram 950 loops back to 954. If not, flow diagram 950 ends at 964.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A photobooth for obtaining one or both of images or videos of a vehicle, the photobooth comprising:
 one or more motors;
 a non-movable portion configured for attachment to rigid non-moving structure relative to ground;
 a movable portion comprises a plurality of posts and a track affixed to the plurality of posts and is configured to move between a retracted position and an extended position, the extended position positioned further away from the rigid non-moving structure and closer to the ground than the retracted position;
 at least one camera affixed to at least one post or to at least a part of the track;
 at least one light affixed to the movable portion; and
 at least one controller in communication with the one or more motors, the at least one camera, and the at least one light, the at least one controller configured to:
  control the one or more motors in order to move an end of each of the plurality of posts to the extended position and in turn the track responsive to a command from the at least one controller so that the at least one camera and the at least one light are moved further away from the non-movable portion in the extended position; and
  control, while the movable portion is in the extended position, the at least one camera in order to obtain one or both of an image or a video of the vehicle.

2. The photobooth of claim 1, wherein the rigid non-moving structure comprises a ceiling;
 wherein the movable portion comprises at least one post;
 wherein the at least one camera and the at least one light are affixed to the at least one post; and
 wherein the one or more motors are configured to move an end of the at least one post away from the ceiling to the extended position responsive to a command from the at least one controller so that the at least one camera and the at least one light are moved further away from the ceiling in the extended position.

3. The photobooth of claim 1, wherein the rigid non-moving structure comprises a ceiling; and
 wherein the at least one camera and the at least one light are affixed to the at least a part of the track.

4. The photobooth of claim 3, wherein the track at least partly encircles the vehicle when positioned underneath the photobooth.

5. The photobooth of claim 3, wherein the at least one camera and the at least one light comprising a camera/lighting combination that are affixed to the movable portion in relative positions to one another;
 wherein the camera/lighting combination are configured to move along the track in combination to maintain the relative positions of the at least one camera and the at least one light to one another; and
 wherein the at least one controller is configured to control the one or more motors in order to move the camera/lighting combination to each of a plurality of predetermined positions along the track in order to obtain respective images at predetermined views of the vehicle.

6. The photobooth of claim 5, wherein the at least one controller is further configured to adjust an angle of the at least one camera in the camera/lighting combination independently of an angle of the at least one light in the camera/lighting combination.

7. The photobooth of claim 3, wherein the movable portion further includes a curtain; and
 wherein the controller is configured to control the one or more motors in order to move an end of the curtain away from the ceiling to an extended position.

8. The photobooth of claim 7, wherein the controller is configured to independently control movement of the end of each of the plurality of posts away from the ceiling and an end of the curtain away from the ceiling.

9. The photobooth of claim 1, wherein the rigid non-moving structure comprises a ceiling of an environment.

10. A photobooth for obtaining one or both of images or videos of a vehicle, the photobooth comprising:
   a structure configured for connection to a ceiling and comprising a non-movable portion;
   a plurality of posts connected to the structure and extending at least partly away from the structure, wherein the plurality of posts comprise a connection end connecting to the structure and an opposite end, the plurality of posts comprising a movable portion configured to move between a retracted position and an extended position, the extended position positioned further away from the ceiling and closer to ground than the retracted position;
   a track connecting the plurality of posts in order to rigidize the plurality of posts, wherein the track is configured to move in response to the plurality of posts moving to the extended position;
   at least one camera affixed to one or more of the plurality of posts or to the track; and
   at least one controller in communication with the at least one camera, the at least one controller configured to:
      control the at least one camera in order to obtain one or both of an image or a video of the vehicle.

11. The photobooth of claim 10, wherein the plurality of posts connected to the structure extend at least partly downward from the ceiling toward ground.

12. The photobooth of claim 10, wherein the plurality of posts comprises at least four posts evenly distributed around the vehicle.

13. The photobooth of claim 10, wherein a camera is positioned at or substantially at the opposite end of each of the plurality of posts.

14. The photobooth of claim 13, wherein the track is connected to the plurality of posts at or substantially at the opposite end of the plurality of posts.

15. The photobooth of claim 10, further comprising at least one light affixed to the one or more of the plurality of posts or to the track and positioned in fixed relation to at least one camera.

16. The photobooth of claim 15, wherein the at least one controller is further configured to adjust an angle of the at least one light.

17. The photobooth of claim 10, wherein the track at least 50% encircles the vehicle positioned underneath the track.

18. The photobooth of claim 10, wherein the track at least 90% encircles the vehicle positioned underneath the track.

19. The photobooth of claim 10, wherein the track is connected closer to the opposite end and further away from the connection end.

* * * * *